(12) United States Patent
Missotten et al.

(10) Patent No.: US 10,034,430 B2
(45) Date of Patent: Jul. 31, 2018

(54) COMBINE HARVESTER WITH ADJUSTABLE INCLINATION OF STRAW WALKERS

(71) Applicant: CNH Industrial America LLC, New Holland, PA (US)

(72) Inventors: Bart M. A. Missotten, Herent (BE); Johan A. Van der Haegen, Gavere (BE); Michiel Vanderstichele, Merkem (BE); Koen Landschoot, Dudzele (BE)

(73) Assignee: CNH Industrial America LLC, New Holland, PA (US)

( * ) Notice: Subject to any disclaimer, the term of this patent is extended or adjusted under 35 U.S.C. 154(b) by 62 days.

(21) Appl. No.: 15/198,987

(22) Filed: Jun. 30, 2016

(65) Prior Publication Data
US 2017/0000032 A1    Jan. 5, 2017

(30) Foreign Application Priority Data

Jun. 30, 2015 (BE) .................................. 2015/5408

(51) Int. Cl.
*A01F 12/30* (2006.01)
*A01D 41/127* (2006.01)
(Continued)

(52) U.S. Cl.
CPC ............ *A01F 12/30* (2013.01); *A01D 41/127* (2013.01); *A01D 41/1243* (2013.01);
(Continued)

(58) Field of Classification Search
CPC combination set(s) only.
See application file for complete search history.

(56) References Cited

U.S. PATENT DOCUMENTS 2,661,005 A * 12/1953 Peters .................. A01F 12/446
                                                      209/26
4,548,214 A   10/1985 Sheehan et al.
(Continued)

FOREIGN PATENT DOCUMENTS

DE    102005050751 A1   8/2007
EP        0178018 A1 *  4/1986  ........... A01D 75/282
(Continued)

OTHER PUBLICATIONS

EP16176815, Extended European Search Report, dated Dec. 6, 2016, 5 pages.

*Primary Examiner* — Alicia Torres
(74) *Attorney, Agent, or Firm* — Patrick M. Sheldrake

(57) ABSTRACT

A combine harvester including at least one straw walker extending in a longitudinal direction of the harvester and supported by a front and rear shaft. The shafts are rotatable about respective rotation axes, and each shaft provided with one or more eccentric portions. The straw walker is rotatably mounted on an eccentric portion of the respective front and rear shafts, so that the simultaneous rotation of the shafts actuates a reciprocating motion of the straw walker. The combine further comprises a pivot frame and one or more actuators, configured to adjust the angular position of the frame by pivoting the frame about a pivot axis oriented transversally to the longitudinal direction. The front and rear shafts are configured to rotate with respect to the pivot frame, so that the straw walker's angular position is adjustable while the straw walker executes the reciprocating motion.

11 Claims, 5 Drawing Sheets

(51) Int. Cl.
 - *A01D 41/12* (2006.01)
 - *A01F 12/56* (2006.01)
 - *A01F 12/44* (2006.01)
 - *A01D 75/28* (2006.01)
 - *A01F 12/38* (2006.01)

(52) U.S. Cl.
 CPC ....... *A01D 41/1276* (2013.01); *A01D 75/282* (2013.01); *A01F 12/38* (2013.01); *A01F 12/446* (2013.01); *A01F 12/448* (2013.01); *A01F 12/56* (2013.01)

(56) References Cited

U.S. PATENT DOCUMENTS

| | | |
|---|---|---|
| 4,557,276 A | 12/1985 | Hyman et al. |
| 2006/0276240 A1* | 12/2006 | Spechtel ................. A01F 12/30 460/85 |
| 2015/0342119 A1 | 12/2015 | Duquesne et al. |

FOREIGN PATENT DOCUMENTS

| | | |
|---|---|---|
| EP | 0451358 A1 | 10/1991 |
| EP | 1817951 A1 | 8/2001 |
| EP | 1584225 A1 | 10/2005 |
| WO | 2014106633 A1 | 7/2014 |

\* cited by examiner

COMBINE HARVESTER WITH ADJUSTABLE INCLINATION OF STRAW WALKERS

CROSS REFERENCE TO RELATED APPLICATION

This application claims priority to Belgium Application No. 2015/5408, filed Jun. 30, 2015, the contents of which are incorporated herein by reference.

FIELD OF THE INVENTION

The present invention is related to agricultural combine harvesters equipped with straw walkers for moving threshed crop materials through the machine.

BACKGROUND OF THE INVENTION

In combine harvesters equipped with one or more axially arranged threshing rotors, straw walkers are mounted downstream of the threshing rotors to transport crop material towards the rear of the combine whilst grain and chaff that falls through the straw walkers is recuperated. The straw walkers are usually shaped as transport frames with a saw-tooth shaped profile, arranged side by side, and subjected to a reciprocating motion which drives the transport of the crops. A phase difference between adjacent straw walkers is applied in these reciprocating movements, usually by mounting the straw walkers on a pair of crank shafts with suitably designed crank portions.

Straw walkers are generally mounted at a forwardly inclined angle, designed in conjunction with the shape and angle of the saw-tooth shaped stages, so as to obtain an efficient transport of the crops when harvesting on essentially flat terrain, in average weather conditions and for a number of crop types. When harvesting uphill or downhill however, transport and discharge of the crops may deteriorate. On any type of terrain, flat or otherwise, optimal operation of the straw walkers may be difficult when harvesting in humid conditions or when certain crop types are harvested which require specific transport forces.

One solution that has been proposed is to make the speed of the reciprocating motion adjustable, as illustrated for example in WO-A-2014/106633, where the speed of the straw walker motion is automatically adjusted to a measurement of the combine's inclination on the field. This improves the efficiency and adaptability of the straw walker operation in changing conditions, but it is still open to improvement in terms of optimizing said operation. EP-A-1817951 proposes a system wherein the straw walkers are not supported by crank shafts but by a plurality of variable length actuators. This solution allows to adapt the shape of the path that defines the reciprocating motion of the straw walkers. It is a solution that allows for a very flexible operation of the straw walkers, and in that regard it does answer to the above-named technical problems. A drawback of this system however is that it is technically very complex, requiring pneumatic or electric actuators, subjected during prolonged periods of time to substantive reciprocating forces. The system is therefore likely to be expensive and/or vulnerable to malfunctioning. DE-A-19649020 describes a combine wherein the straw walkers are mounted on eccentrically rotating bearings coupled to an axle with a fixed diameter instead of to a crank shaft. The degree of eccentricity may be adjustable. This too brings flexibility to the straw walker operation, but it is also quite a complex and expensive solution.

SUMMARY OF THE INVENTION

In accordance with an aspect of the present invention, there is provided a combine harvester comprising at least one straw walker extending in a longitudinal direction of the harvester and supported by a front and rear shaft, said shafts being rotatable about respective rotation axes, each shaft provided with one or more eccentric portions, wherein the straw walker is rotatably mounted on an eccentric portion of the respective front and rear shafts, so that the simultaneous rotation of the shafts actuates a reciprocating motion of the straw walker, wherein the combine is further provided with a pivot frame and one or more actuators, configured to adjust the angular position of the frame by pivoting the frame about a pivot axis oriented transversally to said longitudinal direction, and wherein the front and rear shafts are configured to rotate with respect to the pivot frame, so that the straw walker's angular position is adjustable while the straw walker executes said reciprocating motion.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Various embodiments will now be described with reference to the drawings. The detailed description is not limiting the scope of the invention. The terms 'front' and 'back/rear' are referenced with respect to the forward driving direction of a combine harvester.

Figure 1:
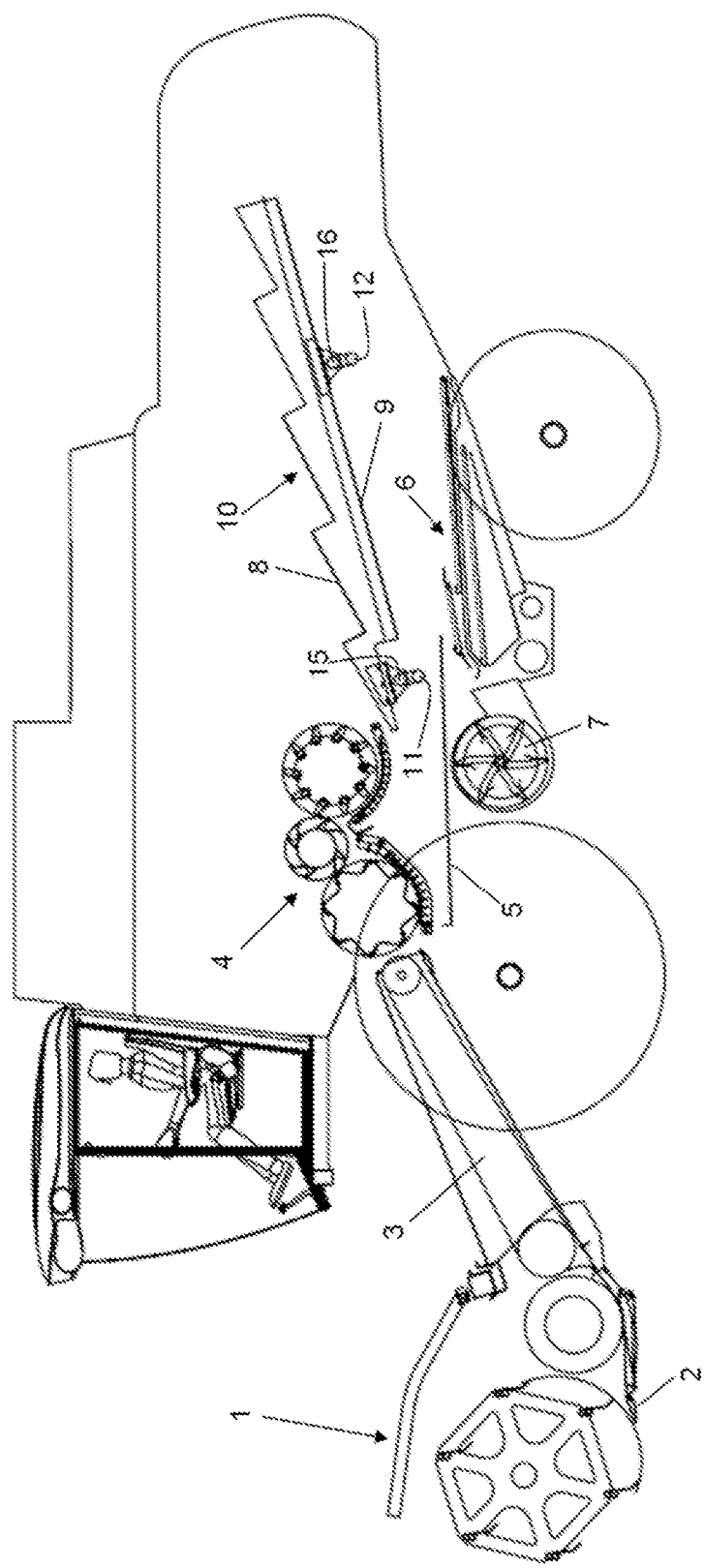
FIG. 1 is a side view of a conventional combine harvester with reciprocating straw walkers.
Figure 2:
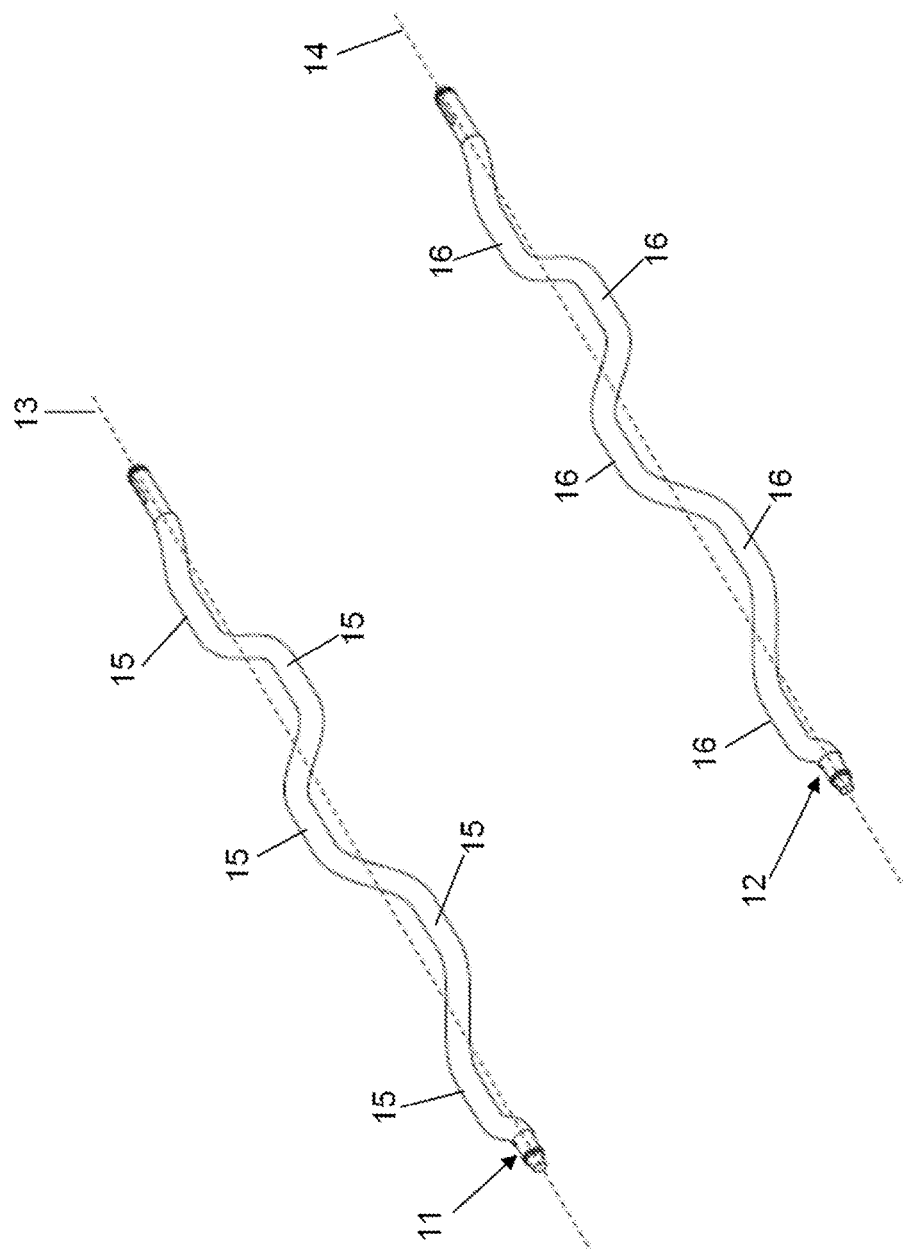
FIG. 2 illustrates crank shafts on which the straw walkers are mounted in the conventional combine of FIG. 1.

FIG. 1 shows a side view of a conventional combine harvester. The combine comprises a header 1 at the front, equipped with knives 2 which cut the crops, e.g. wheat, corn or rice, at a given height from the ground. The crops are gathered towards a feeder section 3, which moves a layer of crops up towards a threshing rotor assembly 4. Here, a majority of grains is separated from the residue crop material, mainly consisting of stalks and leaves, the grains falling onto a grain pan 5 and further towards a set of sieves 6, with light chaff being blown through the sieves by a blower 7. The residue appearing at the exit of the threshing rotor assembly 4 is thrown onto the straw walkers 10. Only one straw walker is shown, but preferably there is a row of adjacently arranged straw walkers as explained above, mounted between side walls of a straw walker compartment of the combine. The straw walkers are mounted on a front and rear crank shaft 11 and 12. FIG. 2 shows a schematic 3D view of the conventional crank shafts 11 and 12, which are rotatable about axes 13 and 14 respectively. The crank shafts 11/12 have crank portions 15/16 extending radially outwards from the rotation axes 13/14.

Each straw walker 10 is rotatably mounted on two bearings (not shown) mounted respectively on the crank portion 15 of the front shaft 11 and on the crank portion 16 of the rear shaft 12. The straw walker's reciprocating motion is thus actuated by the circular motion of the crank portions 15/16 with respect to the rotation axes 13/14. The crank shafts 11/12 themselves rotate in support bearings (not shown) mounted in the side walls of the straw walker compartment or the shafts 11/12 pass through the side walls and rotate in support bearings mounted in lateral support structures.

One of the crank shafts 11/12 is connected to a drive mechanism (not shown) that is configured to drive the rotation of the shaft which—through each straw walker connecting two crank portions 15/16—drives the rotation of the other shaft and the reciprocating motion of the straw walkers. The drive mechanism is preferably powered by the combine's main engine, through a suitable power transmission system as generally known in the art.

The straw walkers have perforated surfaces 8 onto which the residue is transported, and a full bottom plate 9, for transporting grains that have fallen through the perforations back towards the inlet section where the grains fall onto the grain pan 5.

Figure 3:
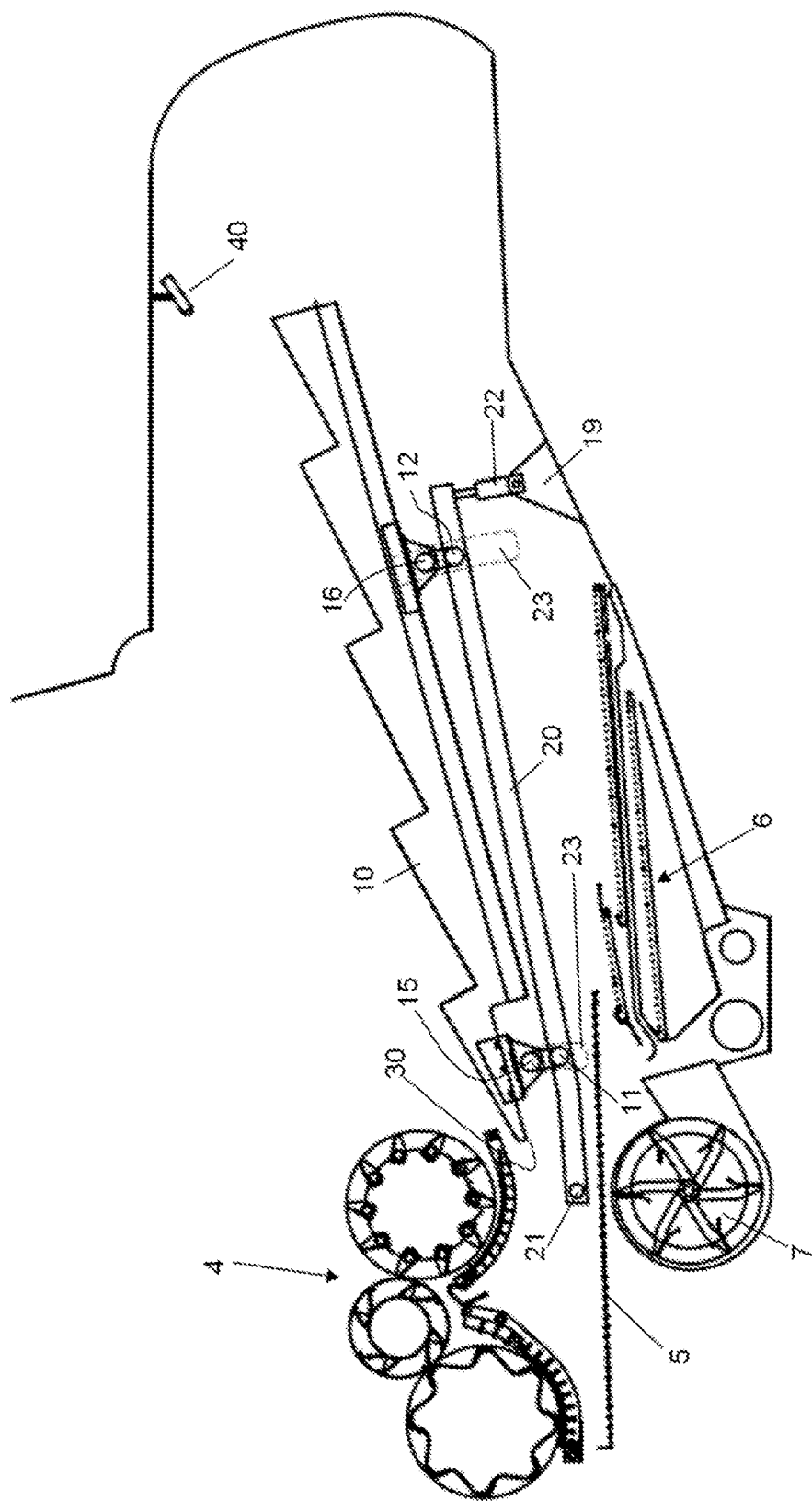
FIG. 3 is a side view of relevant components of a combine harvester, in accordance with an exemplary embodiment of the present invention.

In a combine according to an exemplary embodiment of the present invention, the set of straw walkers 10 as a whole is mounted on a support frame 20 that is pivotable about a pivot axis, so that the inclination angle of the straw walkers is adjustable. A side view of a desirable embodiment is shown in FIG. 3, in accordance with an exemplary embodiment of the present invention. The pivot frame 20 is pivotable at the front side about a pivot axis 21. At the location of the pivot axis 21, the frame 20 is supported by bearings in the side walls of the straw walker compartment or in lateral support structures. At the back of the pivot frame 20, one or more variable length actuators 22 are coupled between the frame 20 and a support structure 19 that may be fixed to the combine's chassis. The actuators 22 are configured to adjust the inclination of the pivot frame 20 with respect to the level of the terrain. The straw walkers 10 are mounted on a pair of crank shafts 11/12 that may be shaped in the same way as in the crank shafts illustrated in FIGS. 1 and 2, i.e., provided with respective crank portions 15/16 onto which the straw walkers 10 are rotatably mounted. These crank shafts 11/12 are rotatable with respect to the pivot frame 20, so that the straw walker's reciprocating motion equally takes place with respect to the frame 20, i.e., the straw walker's angular position is adjustable while the straw walker executes said reciprocating motion. One or more ends of the crank shafts 11/12 may extend outwards from the pivot frame 20, through openings 23 in the side walls of the straw walker compartment, for example for connecting one of the crank shafts to a drive mechanism for driving the rotation of the shaft, desirably a drive mechanism coupled to the combine's main engine through a suitable power transmission system. This drive mechanism would then require a means to drive the rotation of the crank shaft regardless of the angular position of the frame 20. This could be done for example by applying a belt drive equipped with a tensioning system, as generally known in the art.

Figure 4:
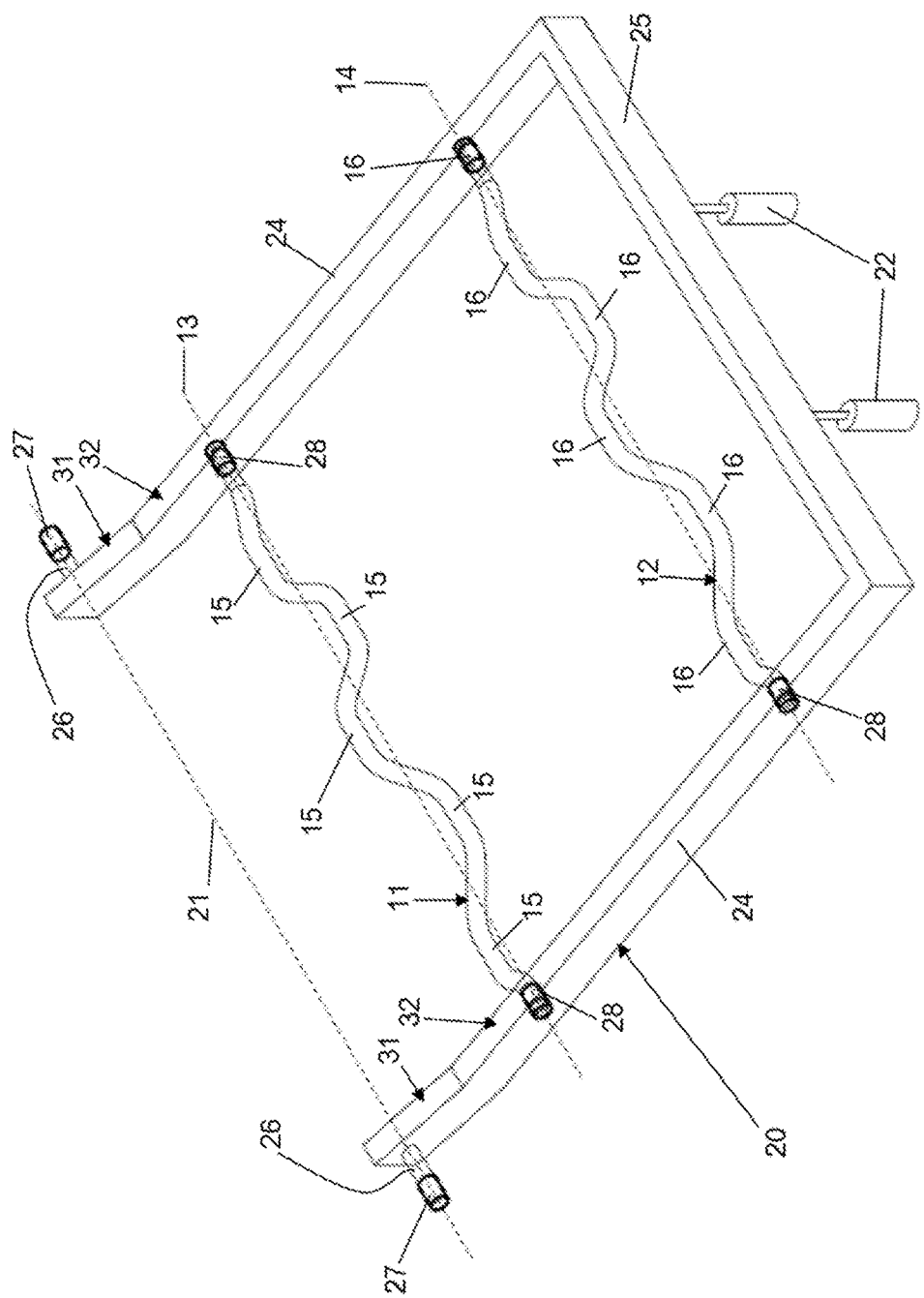
FIG. 4 illustrates a pivot frame and crank shafts on which straw walkers are mounted in the combine of FIG. 3, in accordance with an exemplary embodiment of the present invention.

FIG. 4 shows a 3D view of a pivot frame 20 shaped as a rectangular frame comprising lateral beams 24 and a rear transversal beam 25 to which the actuators 22 are coupled. At the front, the lateral beams 24 may for example be welded to a pair of pivot axles 26 which are pivotable about the pivot axis 21, for example the pivot axles 26 may be supported by bearings 27 mounted in lateral support structures outside the straw walker compartment. Alternatively, the lateral beams 24 may be pivotable about a fixed axle. The crank shafts 11/12 may be supported by bearings 28 mounted in the lateral beams 24 of the pivot frame 20. Alternatively, the bearings 28 may be mounted in support structures that are fixed to the lateral beams 24. As seen in FIGS. 3 and 4, the pivot axis 21 is desirably located in front of the straw walkers 10, i.e. in front of the front rim 30 of the straw walkers 10, regardless of the position of said front rim during the straw walker's reciprocating motion. Another desirable feature, best illustrated in FIG. 4, is that the pivot frame 20 may comprise a front portion 31 and a rear portion 32, with the rear portion 32 carrying the straw walkers 10, and the rotation axis 21 located within the front portion 31, and wherein the front portion 31 is oriented at an upward obtuse angle with respect to the rear portion 32, i.e. the front portion 31 is deflected upwards with respect to the rear portion 32 of the pivot frame. The angle between the directions of the front and rear portions is desirably low, for example about 5-10°. When the front portion 31 is regarded as extending between a proximal end defined by the joint with the rear portion 32, and a distal end, the rotation axis 21 is desirably located at the distal end. These features (location of rotation axis 21 in front of straw walkers 10 and front portion 31 deflected upward with respect to rear portion 32), which may be applied separately or in combination in a harvester according to an exemplary embodiment of the present invention, are advantageous in that they allow to minimize the impact of the pivot frame's angular adjustment on the position of the straw walkers 10 with respect to the exit section of the threshing rotor assembly 4. Having said this, embodiments without one or both of said two features, e.g. pivot axis 21 not in front of the straw walkers 10 and/or lateral beams 24 straight instead of having a deflected front portion 31, are contemplated.

Figure 5:
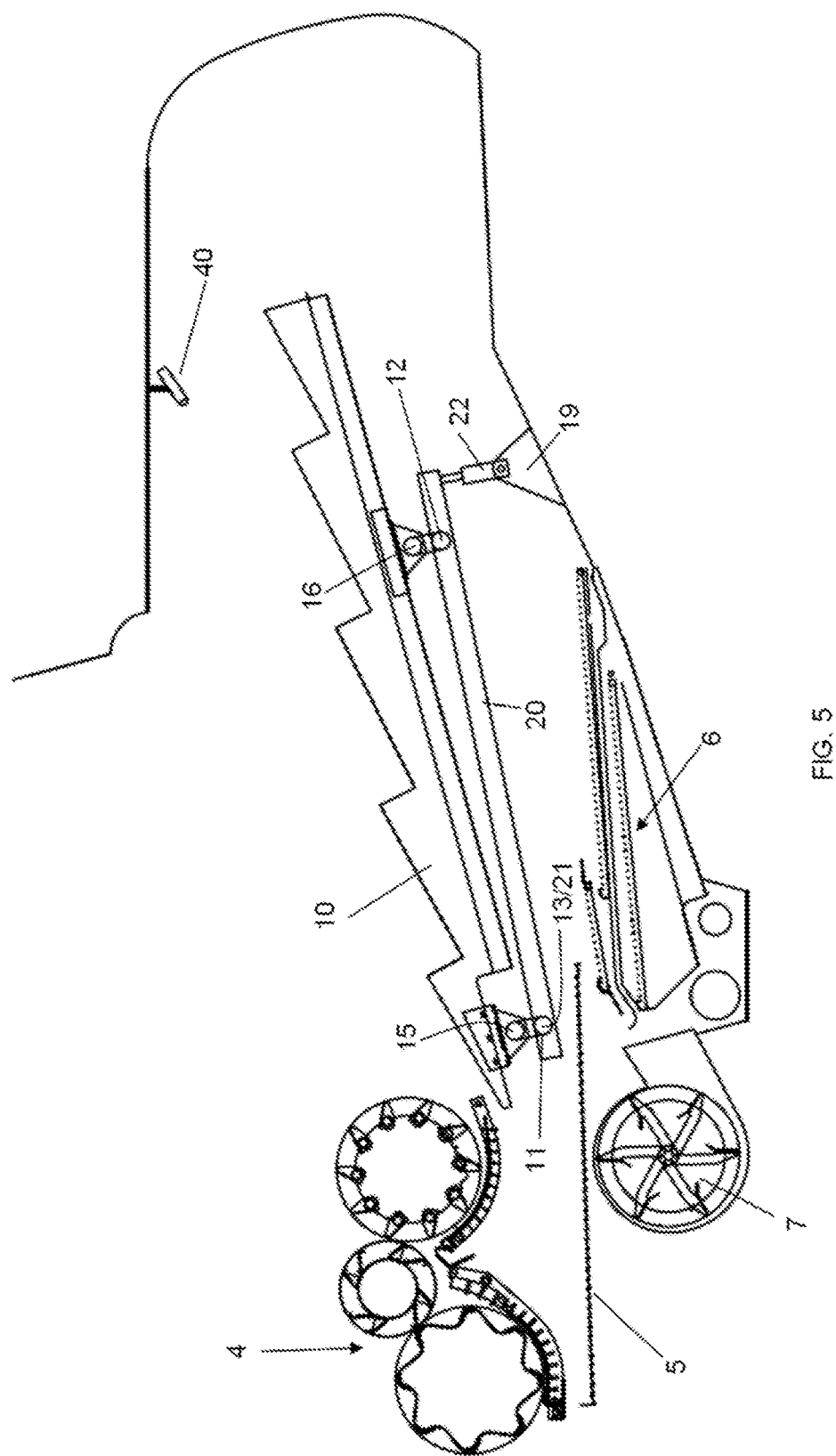
FIG. 5 illustrates another exemplary embodiment of straw walkers, in accordance with an exemplary embodiment of the present invention.

One of these embodiments is shown in FIG. 5, in accordance with an exemplary embodiment of the present invention. In this embodiment, the pivot axis 21 coincides with the rotation axis 13 of the front crank shaft 11. This embodiment has the advantage that the front crank shaft may be coupled to a drive mechanism that does not need to be provided with a tensioning system or the like in order to adapt to a changing angular position of the crank shaft. A drive mechanism as presently known for driving one of the crank shafts can thus be used without changes.

According to embodiments of the present invention, the inclination of the pivot frame 20 is adjusted on the basis of the measurement of one or more operational parameters of the combine harvester. This may be any of the following:

output of a loss sensor mounted downstream of the straw walkers 10 and configured to measure the amount of grains that are evacuated with the residue (i.e. that have not fallen through the straw walkers). This may be a piezo-sensor mounted in connection with a plate and designed to detect impact of grains falling on the plate;

output of any other type of loss sensor known in the art;

output of a sensor that measures the speed and/or layer thickness of the crop throughput on the straw walkers 10, e.g. a camera-type sensor 40 mounted above the straw walkers as illustrated in FIGS. 3 and 5;

output of a sensor that detects the crop type and/or humidity of the crops;

output of a sensor that measures the inclination of the terrain in the forward or rearward direction The above list is not limiting and other sensor outputs could be used as input values for the control of the angular position of the pivot frame 20.

The angular position of the frame 20 and thus of the straw walkers 10 may be controlled depending on the circumstances detected by the sensors, by controlling the length of the variable length actuators 22. For example, the pivot frame 20 may be lifted up when the throughput of residue material through the straw walkers is too fast, when increased grain loss is detected, or when the combine is driving uphill. The pivot frame may be lowered, when the throughput is too slow, or when the combine is driving downhill. The adjustment of the inclination angle of the pivot frame may be controlled automatically according to a pre-defined algorithm implemented in a control unit that receives inputs from one or more sensors and produces an output signal calculated by the algorithm, that is sent to the actuators 22 for positioning the frame at a calculated position.

The angle range for the pivot frame 20 may depend on the size and type of the machine. For example the angular position of the frame may be adjustable in a range of 15° of the pivot angle measured with respect to the pivot axis 21 and with respect to a nominal angular position applied on flat terrain and average conditions. The angle may then be adjustable in the range of −7.5° to +7.5° on either side of this nominal position.

The described embodiments for adjusting the angular position of the straw walkers 10 may be combined with any known systems for regulating the rotation speed of the crank shafts 11/12. In particular, the systems described in WO-A-2014/106633, incorporated herein by reference, may be applied in combination with any of the embodiments described herein.

In any of the embodiments of the present invention, instead of on crank shafts 11/12 with crank portions 15/16, the straw walkers 10 may be supported on straight shafts provided with eccentrically mounted bearings, as shown in DE-A-19649020, which is incorporated herein by reference.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A combine harvester comprising:
a threshing rotor;
a front shaft rotatable about a rotation axis and comprising at least one eccentric portion;
a rear shaft rotatable about a rotation axis and comprising at least one eccentric portion;
at least one straw walker extending in a longitudinal direction of the combine harvester and supported by the front shaft and rear shaft, the at least one straw walker rotatably mounted on the at least one eccentric portion of each of the front shaft and the rear shaft, so that simultaneous rotation of the front shaft and the rear shaft actuates a reciprocating motion of the straw walker, wherein the straw walker is positioned such that at least a majority of the straw walker is located rearward of the threshing rotor;
a pivot frame; and
one or more actuators configured to adjust an angular position of the pivot frame by pivoting the pivot frame about a pivot axis oriented transversally to the longitudinal direction of the combine harvester,
wherein the front shaft and the rear shaft are connected to the pivot frame and configured to rotate about their respective transverse rotation axes with respect to the pivot frame to reciprocate the straw walker, so that an angular position of the pivot frame is adjustable while the straw walker undergoes the reciprocating motion.

2. The combiner harvester according to claim 1, wherein the pivot axis is located in front of the at least one straw walker.

3. The combine harvester according to claim 1, wherein the pivot axis does not coincide with the rotation axis of the front shaft and with the rotation axis of the rear shaft.

4. The combine harvester according to claim 1, wherein the pivot axis coincides with the rotation axis of the front shaft.

5. A combine harvester comprising:
a front shaft rotatable about a rotation axis and comprising at least one eccentric portion;
a rear shaft rotatable about a rotation axis and comprising at least one eccentric portion;
at least one straw walker extending in a longitudinal direction of the combine harvester and supported by the front shaft and rear shaft, the at least one straw walker rotatably mounted on the at least one eccentric portion of each of the front shaft and the rear shaft, so that simultaneous rotation of the front shaft and the rear shaft actuates a reciprocating motion of the straw walker;
a pivot frame, wherein the front and rear shafts are connected to the pivot frame; and
one or more actuators configured to adjust an angular position of the pivot frame by pivoting the pivot frame about a pivot axis oriented transversally to the longitudinal direction of the combine harvester,
wherein the front shaft and the rear shaft are configured to rotate with respect to the pivot frame, so that an angular position of the pivot frame is adjustable while the straw walker undergoes the reciprocating motion;
wherein the pivot frame is formed as a frame comprising lateral beams and a rear transversal beam, wherein the front and rear shafts are supported by bearings mounted in or in connection with the lateral beams, and wherein the one or more actuators are coupled to the rear beam.

6. The combine harvester according to claim 1, wherein the one or more actuators are variable length actuators coupled between the pivot frame and a support structure of the combine harvester.

7. The combine harvester according to claim 1, wherein the pivot frame comprises a front portion and a rear portion, the rear portion carrying the front shaft and the rear shaft, the front portion being oriented upwards at an obtuse angle with respect to the rear portion, and wherein the rotation axis is located within the front portion.

8. The combine harvester according to claim 1, wherein the front and rear shafts are crank shafts and wherein the eccentric portions are crank portions of said crank shafts.

9. The combine harvester according to claim 1, further comprising a control unit configured to:
receive input signals representative of one or more parameters related to operation of the combine harvester;
calculate the angular position of the pivot frame as a function of the input signals; and
send a control signal to the one or more actuators commanding the actuators to move the pivot frame to the angular position based on the calculated angular position of the pivot frame.

10. The combine harvester according to claim 9, wherein the one or more parameters are chosen from the group consisting of: grain loss, throughput speed or layer thickness of crop material on the at least one straw walker, forward or rearward inclination of the combine harvester, crop type, and crop humidity.

11. A combine harvester comprising:
a front shaft rotatable about a rotation axis and comprising at least one eccentric portion;
a rear shaft rotatable about a rotation axis and comprising at least one eccentric portion;
at least one straw walker extending in a longitudinal direction of the combine harvester and supported by the front shaft and rear shaft, the at least one straw walker rotatably mounted on the at least one eccentric portion of each of the front shaft and the rear shaft, so that simultaneous rotation of the front shaft and the rear shaft actuates a reciprocating motion of the straw walker;
a pivot frame, wherein the front and rear shafts are connected to the pivot frame; and
one or more actuators configured to adjust an angular position of the pivot frame by pivoting the pivot frame about a pivot axis oriented transversally to the longitudinal direction of the combine harvester,
wherein the front shaft and the rear shaft are configured to rotate with respect to the pivot frame, so that an angular position of the pivot frame is adjustable while the straw walker undergoes the reciprocating motion;
a control unit configured to:
receive input signals representative of one or more parameters related to operation of the combine harvester;
calculate the angular position of the pivot frame as a function of the input signals; and
send a control signal to the one or more actuators commanding the actuators to move the pivot frame to the angular position based on the calculated angular position of the pivot frame;
wherein the control unit is further configured to control a rotational speed of the front shaft and a rotational speed of the rear shaft on the basis of the one or more parameters.

* * * * *